Dec. 31, 1929.　　　　A. J. LUER　　　　1,741,160
COMBINATION HEATER AND MIXER
Filed May 27, 1926
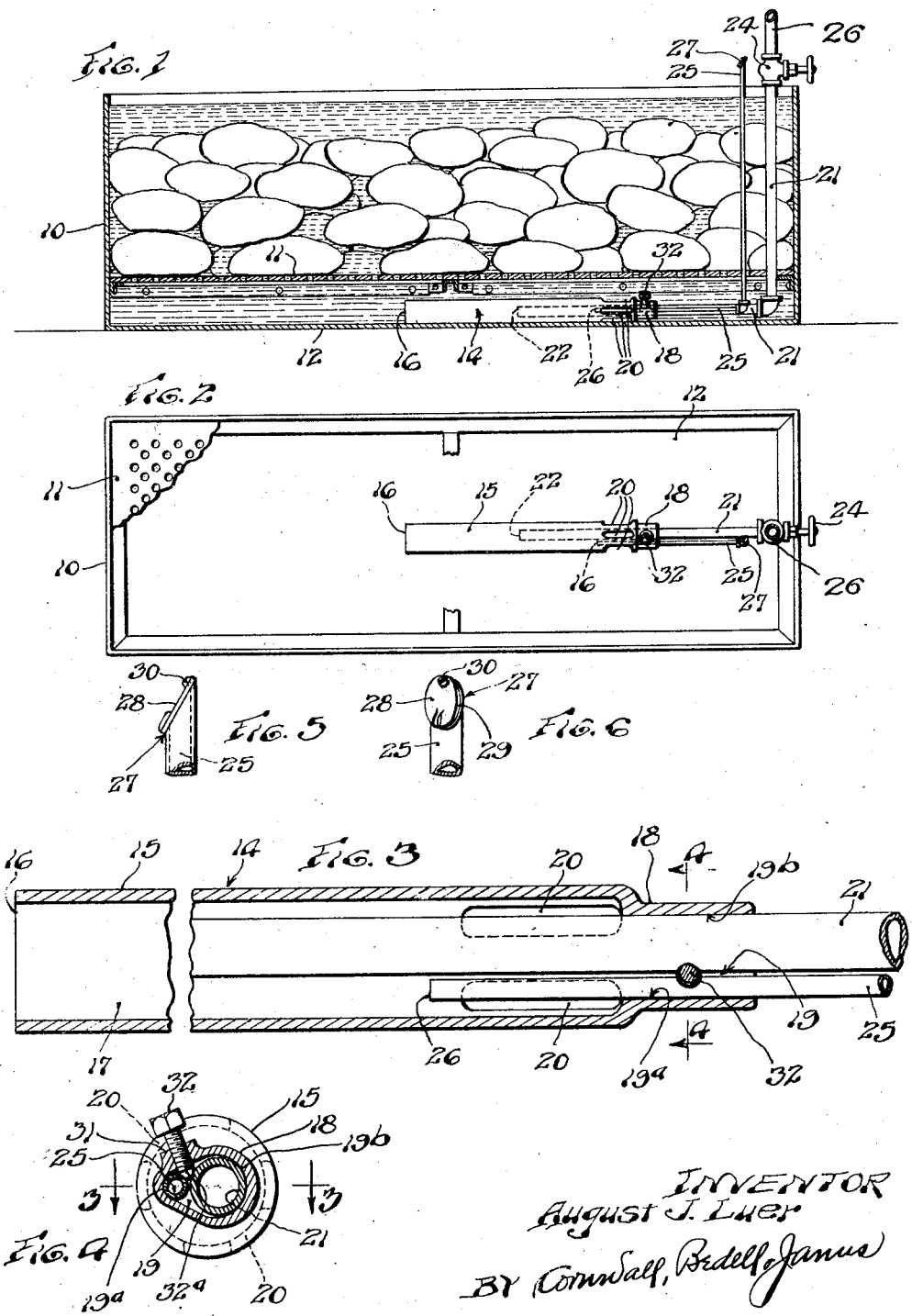

Patented Dec. 31, 1929

1,741,160

UNITED STATES PATENT OFFICE

AUGUST J. LUER, OF ALTON, ILLINOIS

COMBINATION HEATER AND MIXER

Application filed May 27, 1926. Serial No. 112,185.

This invention relates to new and useful improvements in combined mixers and heaters for vats, water tanks, cookers, and the like.

Under the present practice, various water containers, such as vats, ham cookers for packing plants, and the like, are heated by means of steam which is discharged directly into the water contained therein from a steam pipe arranged near the bottom of the tank. This arrangement is very unsatisfactory as the discharge of steam into the water is accompanied by a great deal of noise and hammering and where a metal tank is used the latter acts as a sound board and magnifies the noise to such an extent that it is impossible to carry on conversation in the room in which the tank is located. As more than one tank is usually located in the same room, it is obvious that the simultaneous operation of a number of tanks is very disagreeable and not conducive to the efficient operation of the employees. Furthermore, under this arrangement, no provision is made for proper or forcible circulation of the water and as the natural circulation of the water is hindered by the material contained in the tank, the result is that the water in the tank is unevenly heated. For instance, in the operation of ham cookers, the hams arranged adjacent to the steam pipes will be boiled too much, while the hams in the top layer will remain raw or will be imperfectly cooked.

It is the object of the present invention to provide a device adapted to be positioned in the tank for mixing steam with the water container therein, which device is for all practical purposes noiseless in operation and insures efficient circulation of water so that uniform temperature prevails throughout the tank.

Other objects of the invention are to provide a mixer and circulator for steam heated vats, which mixer is of simple and strong construction, can be manufactured at low cost, and can be readily placed in position in the tank without requiring special fittings or structural changes in the tank.

Further objects of the invention are to provide a heating and mixing device adapted to be positioned in the tank and having a steam discharge connection arranged in the chamber of said device in a definite relation with the inlet and outlet openings thereof and provided with a connection for admitting air into said chamber at a point between the inlet opening of the chamber and the discharge point of the steam, whereby air is mixed with the water in said chamber at a definite point with respect to the steam discharged, and circulation of water in the tank is provided by the arrangement of said steam connection in said chamber.

With these and other objects in view my invention consists in certain novel features of construction and arrangement of parts, hereinafter more fully described and claimed, and illustrated in the accompanying drawings, in which—

Figure 1 is a vertical cross section taken longitudinally through a tank and showing my improved device in position therein.

Figure 2 is a top plan view of the tank with parts broken away.

Figure 3 is a longitudinal section taken on line 3—3 of Figure 4.

Figure 4 is a transverse cross section taken on line 4—4 of Figure 3.

Figure 5 is a side elevational view of the intake end of the air pipe.

Figure 6 is a front elevational view of same.

Referring by numerals to the accompanying drawings, 10 represents a tank which, in the present instance, is shown in the form of a vat cooker, such as are used in packing plants for boiling hams, sausages, and the like. This vat preferably is provided with a horizontally disposed perforate wall 11 located a suitable distance above bottom 12 of tank 10, thereby spacing the material to be cooked from the heating device 14 which is arranged on the bottom 12 of said tank. This heating device in the present instance consists of a tubular member 15 of suitable length. This member 15 is preferably located slightly toward the rear end of said tank and is open at the front or discharge end to provide outlet opening 16 for chamber 17 formed in said member. This discharge end is disposed substantially equi-distant from both ends of the tank or vat 10. The opposite end terminates in reduced portion 18 having longitudinal opening 19 leading into said chamber. A series of inlet openings 20 is formed in the peripheral wall of member 15 adjacent to said reduced portion 18.

A steam pipe 21 extends through opening 19 longitudinally into chamber 17 and has its discharge end 22 terminating about halfway or less in said chamber. This pipe 21 extends outwardly from tank 10 and is connected to a suitable source of steam supply and a valve 24 is interposed in said pipe for regulating the discharge of steam into said tank. The force of steam discharged through end 22 is directed toward the open end 16 of chamber 17, thereby forcing the water and the steam outwardly from said chamber toward one end of tank 10. This produces suction at the inlet opening 20 whereby fresh water is induced to enter the chamber 17 to be mixed with steam in said chamber. In this manner, the water contained in the tank is forced to circulate through said chamber 17 wherein it is mixed with the steam so that the water throughout the tank is properly heated.

In order to eliminate noises and hammering produced by the discharge of steam in a body of water, I provide an air pipe connection 25, the discharge end 26 of which terminates in chamber 17 at a point between the inlet opening 20 and the steam discharge end 22. Pipe 25 extends outward from tank 10 and is open to the atmosphere so that the suction produced in chamber 17 by the discharge of steam draws air into said chamber through pipe 25 and such air is mixed with the water at a point between the inlet openings 20 and the steam discharge point 22. This admission of air into the water in a chamber having located therein a steam discharge connection serves to check all the noises and hammering so that the operation of the heater is practically noiseless. Presumably the air contained in the water forms cushioning means which absorb the shock produced by the impact of steam against water. The outer end of pipe 25 is provided with a valve 27 for controlling the volume of air admitted to the heater. This valve preferably consists of a plate 28 for closing the opening 29 formed by cutting one end of pipe 25 obliquely so as to provide a comparatively large opening. This plate is pivotally secured to the pipe by suitable fastening means 30 so that said plate may be positioned to regulate the size of the intake opening.

Air pipe 25 is arranged to one side of steam pipe 21 and opening 19 is provided with spaced seats 19$^a$ and 19$^b$ for receiving air pipe 25 and steam pipe 21, respectively, said seats being formed of appropriate cross sectional areas to accommodate the respective pipes.

In order to provide simple means for securing said pipes in position, the reduced portion 18 is provided with a threaded bore 31 disposed transversely of the axes of said pipes and at a point intermediate said pipes. A set screw 32 is screw-seated in said opening and has a tapered end 32$^a$ which, when the screw is tightened, wedges between said pipes, thereby fixing said pipes in position in said member 15. In this manner, the machining operations necessary on my device are reduced to minimum, and a simple and efficient structure is provided for discharging steam into the water contained in the tank and simultaneously draw air into the mixing chamber for eliminating hammering and noises incidental to the discharge of steam into the water.

The admission of proper amount of air is obtained by first turning on the steam full force and then adjusting the air valve 27 until the device functions properly. The intake of air into the device will thereafter be controlled automatically in correlation with the flow of steam, the suction of air being automatically reduced when the amount of steam discharged into the device is reduced and vice versa. The discharge of steam longitudinally in a chamber, having inlet and outlet openings at or near its ends, provides proper mixing of steam and water and induces an efficient circulation of the water through the tank, thereby insuring uniform and rapid heating of the water.

A device of my improved construction is very simple, contains but few parts, can be readily adjusted, and is highly efficient in operation. The admission of air to the water in the steam chamber, renders the device practically noiseless in operation, making it especially desirable in establishments having a number of cooking vats, washing tanks, and other water containers heated by admitting steam thereinto.

While I have shown and described the preferred form of my invention, it is obvious that minor changes in the size, form and construction of the various parts of my device may be made and substituted for those herein shown and described without departing from the spirit of my invention as expressed in my claims.

I claim:

1. In a steam heater for vats and the like, the combination with a vat, of a tubular member open at both ends and disposed longitudinally in said vat, said member having an intake end arranged adjacent to one end of said vat and having its discharge end terminating substantially equidistant from the ends of said vat, said tubular member being provided with a series of circumferentially disposed openings near the intake end thereof, a steam pipe extending longitudinally into said tubular member through the intake end thereof and having its discharge end terminating intermediate the discharge end of said tubular member and said circumferential openings, an air pipe arranged adjacent to said steam pipe and extending longitudinally into said tubular member through the intake end thereof and having its discharge end terminating intermediate said circumferential openings and the discharge end of said steam pipe, the opposite end of said air pipe extending exteriorly of said vat and being open to atmosphere, whereby air is sucked into said tubular member by the discharge of steam thereinto, and means in said intake end of said tubular member for securing said pipes in position therein.

2. In a steam heater for vats and the like, the combination of an open top vat, a tubular member disposed longitudinally therein near one end thereof and having its discharge end terminating at a point remote from both ends of said vat, the opposite end of said member being reduced in diameter, there being intake openings formed in the peripheral wall of said tubular member near the reduced end thereof, a steam pipe extending longitudinally into said member through the reduced end thereof and having its discharge end terminating substantially equidistant from the ends of said member, an air pipe extending into said member through the reduced end thereof and arranged adjacent to said steam pipe, the discharge end of said air pipe terminating immediately past the intake openings of said member while the opposite end of said air pipe extends above said vat and opens to the atmosphere for admitting air by suction into said tubular member, and valve means in said air pipe for regulating the passage of air therethrough.

3. In a steam heater for vats and the like, the combination of an open top vat, a tubular member disposed longitudinally therein near one end thereof and having its discharge end terminating at a point remote from both ends of said vat, the opposite end of said member being reduced in diameter, there being intake openings formed in the peripheral wall of said tubular member near the reduced end thereof, a steam pipe extending longitudinally into said member through the reduced end thereof and having its discharge end terminating substantially equidistant from the ends of said member, an air pipe extending into said member through the reduced end thereof and arranged adjacent to said steam pipe, the discharge end of said air pipe terminating immediately past the intake openings of said member while the opposite end of said air pipe extends above said vat and opens to the atmosphere for admitting air by suction into said tubular member, valve means in said air pipe for regulating the passage of air therethrough, and means in the reduced end of said tubular member for detachably engaging and clamping said steam and air pipes in position.

4. In a device of the class described, the combination of an open top vat, a tubular member disposed longitudinally in said vat near one end thereof and having its discharge end located substantially halfway of said vat, a stem pipe extending longitudinally into said member through the opposite end thereof, said steam pipe having its discharge end terminating substantially equidistant from the ends of said tubular member, an air pipe extending into said tubular member adjacent to said steam pipe and having its discharge end spaced rearwardly of the discharge end of said steam pipe, there being intake openings formed in said tubular member rearwardly of the discharge end of said air pipe, said air pipe extending above said vat and opening to the atmosphere to allow air to be sucked into said tubular member by the steam discharged thereinto, a valve in said air pipe for regulating the amount of air admitted into said tubular member, and means in the rear end of said tubular member for simultaneously clamping said pipes in position therein, said means being detachable to allow the longitudinal adjustment of said pipes relative to each other and to said tubular member.

In testimony whereof I hereunto affix my signature this 24th day of May, 1926.

AUGUST J. LUER.